United States Patent
Valadbeigi et al.

(10) Patent No.: US 12,548,240 B2
(45) Date of Patent: Feb. 10, 2026

(54) MAP TILE CULLING FOR DISPLAYING GLOBE REPRESENTATIONS IN AN ELECTRONIC MAP SYSTEM

(71) Applicant: Mapbox, Inc., Washington, DC (US)

(72) Inventors: Fouad Valadbeigi, Lodz (PL); Mikko Pulkki, Helsinki (FI)

(73) Assignee: Mapbox, Inc.

( * ) Notice: Subject to any disclaimer, the term of this patent is extended or adjusted under 35 U.S.C. 154(b) by 185 days.

(21) Appl. No.: 18/440,277

(22) Filed: Feb. 13, 2024

(65) Prior Publication Data
US 2024/0273812 A1 Aug. 15, 2024

Related U.S. Application Data

(60) Provisional application No. 63/576,528, filed on Feb. 14, 2023, provisional application No. 63/445,296, filed on Feb. 13, 2023.

(51) Int. Cl.
*G06T 15/40* (2011.01)
*G06T 7/13* (2017.01)
(Continued)

(52) U.S. Cl.
CPC .............. *G06T 15/40* (2013.01); *G06T 7/13* (2017.01); *G06T 7/50* (2017.01); *G06T 7/60* (2013.01);
(Continued)

(58) Field of Classification Search
CPC ....... G06T 11/60; G06T 11/00; G06T 13/205; G06V 10/44; G10L 21/10; G10L 15/02; G10L 15/063; G10L 21/0316; G06F 16/64
(Continued)

(56) References Cited

U.S. PATENT DOCUMENTS 6,389,289 B1 * 5/2002 Voce .................. H04B 7/18547
455/446
8,260,007 B1 * 9/2012 Furukawa ............... G06T 7/596
702/33
(Continued)

FOREIGN PATENT DOCUMENTS

EP 3435670 A1 * 1/2019 ........... G06T 15/205

OTHER PUBLICATIONS

Bladin et al.; "Globe Browsing: Contextualized Spatio-Temporal Planetary Surface Visualization"; IEEE Transactions on Visualization and Computer Graphics, vol. 24, No. 1; Jan. 2018 (Year: 2018).*
(Continued)

*Primary Examiner* — David T Welch
(74) *Attorney, Agent, or Firm* — Fenwick & West LLP

(57) ABSTRACT

Functionality of an electronic map system allows the more efficient rendering of a map on the surface of a globe. The functionality includes culling functionality to more effectively remove from further processing the "tiles" of map data that will not end up being displayed on the globe. The culling functionality analyzes factors such as the present zoom level, a relationship of a tile to a map center, and a relationship of a three-dimensional bounding box of the tile to a present viewing frustrum, culling tiles that will not ultimately need to be rendered due to not being visible. The functionality also includes operations on the GPU buffer memory that better manage that memory, such as allocating only a single buffer for a grid of vertices, and causing less rendering towards the poles of the globe.

9 Claims, 2 Drawing Sheets

(51) Int. Cl.
    *G06T 7/50*         (2017.01)
    *G06T 7/60*         (2017.01)
    *G06T 7/73*         (2017.01)
    *G06T 15/00*       (2011.01)

(52) U.S. Cl.
    CPC .............. *G06T 7/73* (2017.01); *G06T 15/005* (2013.01); *G06T 2210/12* (2013.01); *G06T 2210/21* (2013.01)

(58) Field of Classification Search
    USPC ........................................................ 345/421
    See application file for complete search history.

(56) References Cited

U.S. PATENT DOCUMENTS

| | | | | |
|---|---|---|---|---|
| 2009/0037441 | A1* | 2/2009 | Howell | H04N 21/4312 |
| 2012/0254804 | A1* | 10/2012 | Sheha | G06F 3/0488 |
| | | | | 715/834 |
| 2013/0321411 | A1* | 12/2013 | Pahwa | G06T 17/05 |
| | | | | 345/420 |
| 2015/0356088 | A1* | 12/2015 | Berkhin | G06F 16/24578 |
| | | | | 707/769 |
| 2016/0217611 | A1* | 7/2016 | Pylvaenaeinen | G06T 15/405 |
| 2017/0090460 | A1* | 3/2017 | Andrew | B29C 64/386 |
| 2017/0091993 | A1* | 3/2017 | Andrew | G06T 19/00 |
| 2020/0050884 | A1* | 2/2020 | Han | G06V 20/10 |
| 2020/0072610 | A1* | 3/2020 | Hofmann | G06V 20/176 |
| 2020/0107003 | A1* | 4/2020 | Phillips | H04N 13/344 |
| 2020/0225903 | A1* | 7/2020 | Cohen | G09G 5/12 |
| 2021/0105313 | A1* | 4/2021 | Wang | H04L 65/70 |
| 2021/0368190 | A1* | 11/2021 | Sjöberg | H04N 19/44 |

OTHER PUBLICATIONS

Valadbeigi, F., "Tile cover optimization for globe #11508," GitHub, Inc., Feb. 25, 2022, pp. 1-19.

* cited by examiner

MAP TILE CULLING FOR DISPLAYING GLOBE REPRESENTATIONS IN AN ELECTRONIC MAP SYSTEM

RELATED APPLICATIONS

This application claims the benefit of Provisional Application No. 63/445,296, filed on Feb. 13, 2023, and Provisional Application No. 63/576,528, filed on Feb. 14, 2023, both of which are incorporated herein by reference.

FIELD OF ART

This disclosure relates generally to the field of computer graphics, and more specifically, to efficient operations for rendering maps in a globe view.

BACKGROUND

Traditionally, electronic map systems display maps using a flat planar view. However, there are many contexts in which users may prefer alternative, non-planar views for visualizing a geographical area. Visualizing geography on a more real-world representation, such as the surface of a globe, is one such alternative view. However, properly rendering geography mapped to a sphere presents additional challenges that traditional planar renderings do not, and such spherical rendering can therefore be highly inefficient in terms of processor usage and memory usage unless carefully implemented.

SUMMARY

Functionality of an electronic map system allows the more efficient rendering of a map on the surface of a globe, as opposed to on a flat plane. The functionality includes culling functionality to more effectively remove from further processing the "tiles" of map data that will not end up being displayed on the globe. The culling functionality analyzes factors such as the present zoom level, a relationship of a tile to a map center, and a relationship of a three-dimensional bounding box of the tile to a present viewing frustrum, culling tiles that will not ultimately need to be rendered due to not being visible. Avoiding processing needed for rendering, for tiles that will not ultimately need to be rendered, saves considerable processing time and also accordingly allows faster frame rates.

The functionality also includes operations on the GPU buffer memory that better manage that memory, such as allocating only a single buffer for a grid of vertices, and causing less rendering towards the poles of the globe.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
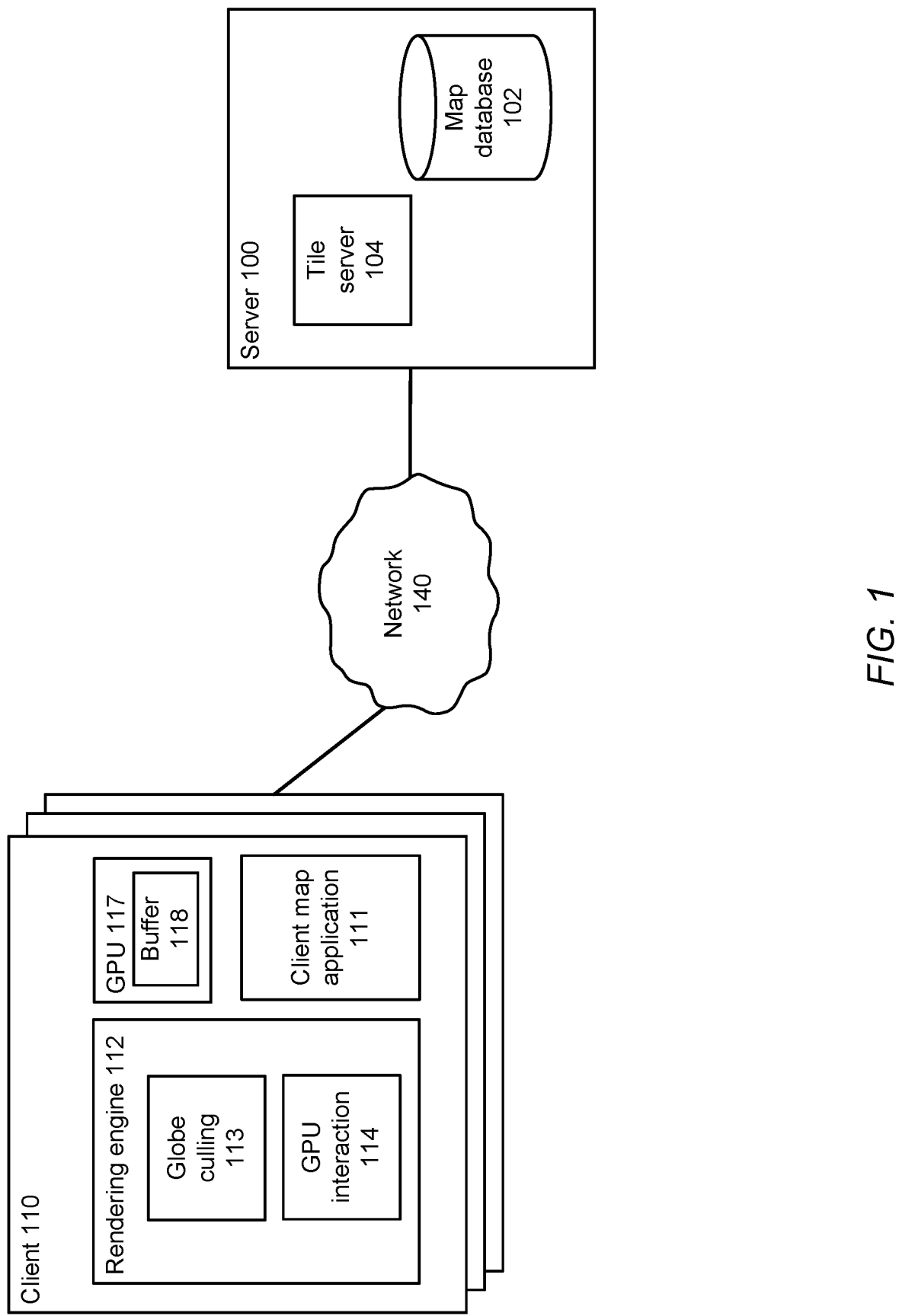
FIG. 1 illustrates a computer environment in which a client and server interact to render electronic maps, including maps in which the geographic data is displayed on the surface of a globe, such as in a representation of a portion of the Earth, according to some embodiments.

FIG. 1 illustrates a computer environment in which a client 110 and server 100 interact to render electronic maps, including maps in which the geographic data is displayed on the surface of a globe, such as in a representation of a portion of the Earth, according to some embodiments. The server 100 provides map data to the client 110 in the form of geographic regions (known as "vector tiles", or simply "tiles"), e.g., rectangular regions, of map information. The client 110 receives the data for the tiles and renders it on a map, such as a map in the form of a globe. These various components are now described in additional detail.

The server 100 stores digital map data in a map database 102. The map data is provided, either directly or indirectly, to client map applications, such as client map application 111, e.g., using an API. The map data is organized as a plurality of vector tiles. Each vector tile corresponds to a particular geographic region and may be subject to style data to impose different display styles. The map data may include multiple sets of vector tiles, each representing the map at a particular level of detail, as appropriate for different zoom levels. Thus, the same geographic point may be represented within multiple different tiles, each corresponding to a different zoom level. The map data may be updated at any suitable interval, and may include additional information beyond purely describing visual geometry. For example, using aggregated telemetry data, various additional information may be stored in the vector tiles, such as traffic patterns, turn restrictions, detours, common or popular routes, speed limits, new streets, and any other information related to electronic maps or the use of electronic maps.

The server includes a tile server module 104 that provides a client map application with data for a set of vector tiles, as appropriate for the current state or operation of the application. For example, a particular client map application may currently be displaying a particular town or other region in California, and the tile server 104 may accordingly provide the application with tiles corresponding to that general region, which the application can then render on a map. Selecting which of the tiles to render is relatively straightforward when rendering a planar map, but is more difficult when rendering a map on a globe representation, as is discussed in more detail below.

The client 110 includes a client map application 111 that displays an electronic map using tile data provided by the tile server 104 of the server 100. For example, the client map application 111 can be a browser-based application running in a web browser, or a native application.

The client 110 includes a graphics processing unit (GPU) 117 used to accelerate the rendering of graphics, such as an electronic map. The GPU 117 has a buffer 118, which is an area of memory used by the GPU to control the rendering operations.

The client map application 111 also has or uses a rendering engine 112 that renders a map using the tiles provided by the tile server 104. In particular, the rendering engine 112 has a globe culling module 113 and a GPU interaction module 114 that provide more efficient processing when rendering electronic maps on a globe.

Culling algorithms for planar views are sub-optimal when applied to globe views, leading to many tiles being fetched, processed, and uploaded for viewing, yet ultimately not being displayed in the globe view. This results in considerable unnecessary processing and memory usage. To this end, given a set of tiles from the tile server, the globe culling module 113 removes from consideration in the rendering process those tiles that will be outside the current view of the globe, given the current zoom level and viewing location. The globe culling module 113 computes a three-dimensional bounding box to determine whether a given tile fits within a certain region that will ultimately be displayed on screen in the globe view. The bounding box should fit the curvature of the globe accurately in order to filter out tiles that will not actually be displayed.

In some embodiments, the globe culling module 113 employs the following operations when rendering a digital map from a given location and at a given zoom level.

(a) The zoom level of the current view is considered. If the zoom level represents at least some threshold distance from the globe being rendered, then the viewpoint origin will be sufficiently far away from the globe that all of the tiles mapped on the globe will be within the viewing "frustum" that originates at the viewpoint origin and ends along the surface of the globe.

Accordingly, since each tile is located within the current view, no tiles are culled, and the culling process terminates. If the zoom level indicates being closer than the threshold distance, however, then the globe culling module 113 proceeds to perform the following operations for each tile.

(b) The "world coordinates" of the tile (the coordinates of the tile within a universal coordinate system applicable to all the tiles) are determined. In some embodiments, the tile coordinates are stored directly, in which case they are simply read into memory. In other embodiments, a tile is described by an identifier, which then is looked up to obtain its coordinates. For example, in some embodiments the tiles are stored in a quad tree data structure that describes tile positions relative to other tiles, and those relative tile positions are converted to world coordinates. The tile coordinates may be expressed as Earth-centered, Earth-fixed (ECEF) coordinates (Cartesian coordinates in which the origin (0, 0, 0) corresponds to the center of the globe), and if so may be converted to world coordinates.

(c) Given the world coordinates of the tile, the bounding box is calculated.

(d) If the map center point (that is, the point in the center of the viewing plane, possibly with a slight offset to account for edge insets) is inside the two-dimensional projection of the tile, then the tile will be at least partially visible given the current zoom level and viewing position, and the calculated three-dimensional bounding box is therefore returned without further modification, with the process proceeding to operation (h) below. If, however, the map center point is not inside the two-dimensional projection of the tile, then the tile might not be visible at all and therefore the bounding box of the tile will need to be adjusted according to the curvature of the globe in preparation for more precise visibility/intersection tests. To that end, the following operations (e)-(h) are performed.

(e) The edges of the tile on the globe are identified. Due to the curvature of the globe, these edges are arcs.

(f) Of the identified edges of the tile, the edge (arc) that is the closest to the center of the map is further identified.

(g) The local extremum values of the closest edge are determined in each spatial dimension (that is, (x, y, z)); these local extremum values are used to adjust the width, depth, and height of the bounding box determined in operation (c). The adjustment of the bounding box based on the globe curvature results in an optimal fit—that is, the volume of the bounding box is minimized. The SLERP (quaternion spherical linear interpolation) function may be used in the computation of the local extremum values.

(h) The bounding box determined thus far for the tile is compared to the viewing frustrum. If there is no intersection between the bounding box and the viewing frustrum, then the tile is not visible, and is accordingly culled (that is, not processed further as part of the current map rendering).

The globe culling module 113 thus results in more efficient rendering operations by removing from consideration tiles that will not ultimately be included in a rendering, rather than needlessly performing further costly processing operations on them.

The GPU interaction module 114, in turn, further improves efficiency when rendering a map on a globe through minimization of data transfer to the graphics processing unit (GPU) by reusing geometric information, and also by reducing geometric information for regions closer to the global poles, as is now described in more detail.

When rendering the visible portion of the map, the GPU interaction module 114 creates a rectangular grid of vertices corresponding to the corners of the tiles and uploads it to the GPU 117 where it may be consumed by the graphics pipeline. Since the grid is in essence "wrapped" around the globe visually, and the circumference of the globe is smaller towards the poles, including less detail nearer to the poles does not greatly reduce the resolution near the poles, while still requiring fewer calculations and thus supporting higher framerates than would otherwise be possible. Accordingly, in some embodiments the GPU interaction module 114 renders only an increasingly small subset of the data of the vertices of the grid the nearer the rendering comes to the poles. Because the grid is of a predetermined size, a single fixed-size block of memory can be allocated within the GPU buffer 118, rather than needing to allocate a separate buffer for each tile, leading to memory usage increasing with the number of visible tiles.

For each of the tiles to be rendered (i.e., the tiles not culled by the globe culling module 113), a "grid matrix"—a set of variables required to render the shared geometry for the different tiles, including information for positioning a tile on the globe, and information about the resolution of the tile—is computed.

When performing vertex shading for each of the tiles, the GPU interaction module 114 selects the vertices corresponding to that tile, and transforms the vertex coordinates (e.g., into ECEF coordinates) using the grid matrix. The transformed (e.g., ECEF) coordinates are further transformed into two-dimensional screen coordinates using conventional globe and projection matrices.

Note that the same approach is used for each of the tiles to be rendered, and as a consequence there is no need to recalculate tile geometries for each tile separately.

The client devices 110 are computing devices such as smart phones, laptop computers, desktop computers, or any other device that can run client map applications 111 to render an electronic map.

The network 140 may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

Although the discussion above describes the client 110 receiving the data from the server 100 and performing the rendering, the responsibilities may be distributed differently between client and server in other embodiments. For example, in other embodiments the server 100 may alternatively and/or additionally perform the functionality of the globe culling module 113 to identify only the tiles that will be displayed in the current view of a globe, or perform the rendering and send the rendered images to the client 110 for display.

Figure 2:
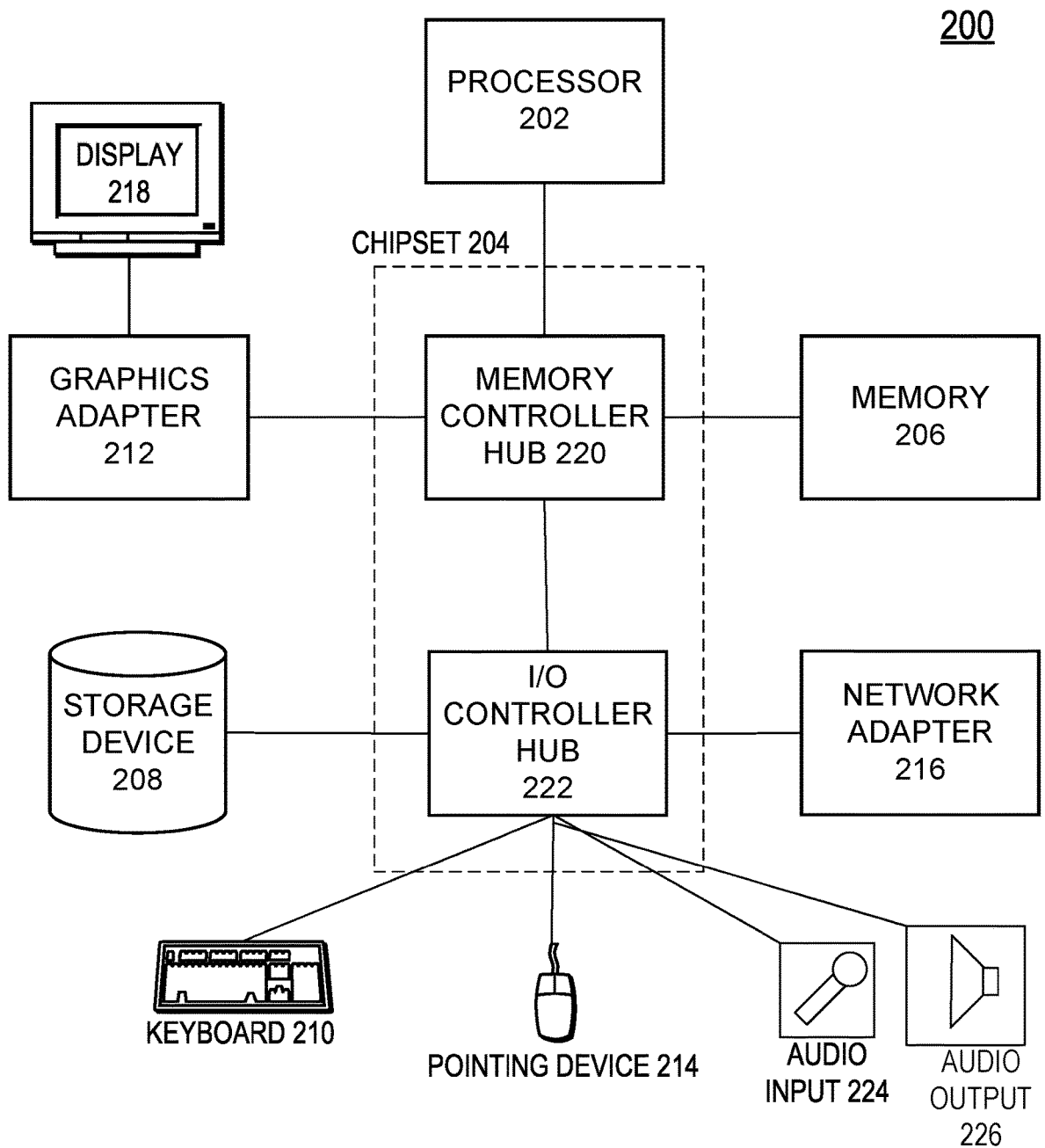
FIG. 2 is a high-level block diagram illustrating physical components of a computer used as part or all of the client or server from FIG. 1, according to one embodiment.

FIG. 2 is a high-level block diagram illustrating physical components of a computer 200 used as part or all of the client 110 or server 100 from FIG. 1, according to one embodiment. Illustrated are at least one processor 202 coupled to a chipset 204. Also coupled to the chipset 204 are a memory 206, a storage device 208, a graphics adapter 212, and a network adapter 216.

A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any non-transitory computer-readable storage medium, such as a hard drive, compact disk read-only memory (CD-ROM), DVD, or a solid-state memory device. The memory 206 holds instructions and data used by the processor 202. The graphics adapter 212 displays images and other information on the display 218. The network adapter 216 couples the computer 400 to a local or wide area network. The keyboard 210 and pointing device 214 allow a user to manually provide input. The audio input (e.g., microphone) 224 and output (e.g., internal or external speaker) 226 provide the ability obtain sound input (e.g., for speech recognition) and produce sound output.

As is known in the art, a computer 200 can have different and/or other components than those shown in FIG. 2. In addition, the computer 200 can lack certain illustrated components. In one embodiment, a computer 200 acting as a server may lack a graphics adapter 212, and/or display 218, as well as a keyboard 210, pointing device 214, and/or audio input 224 and output 226. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

One possible embodiment has been described herein. Those of skill in the art will appreciate that other embodiments may likewise be practiced. First, the particular naming of the components and variables, capitalization of terms, the attributes, data structures, or any other programming or structural aspect is not mandatory or significant, and the mechanisms described may have different names, formats, or protocols. Also, the particular division of functionality between the various system components described herein is merely for purposes of example, and is not mandatory; functions performed by a single system component may instead be performed by multiple components, and functions performed by multiple components may instead be performed by a single component.

Some portions of the above description present the inventive features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects described herein include process steps and instructions in the form of an algorithm. It should be noted that the process steps and instructions could be embodied in software, firmware or hardware, and when embodied in software, could be downloaded to reside on and be operated from different platforms used by real time network operating systems.

The concepts described herein also relate to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the concepts described herein are not described with reference to any particular programming language. It is appreciated that a variety of programming languages may be used to implement the teachings as described herein, and any references to specific languages are provided for purposes of enablement and best mode.

The concepts described herein are well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the concepts described herein, which are set forth in the following claims.

What is claimed is:

1. A computer-implemented method of visually representing a geographical region mapped onto a surface of a globe in an electronic map system, the method comprising:
    obtaining information for a tile from a geographic map database;
    determining a zoom level of the tile;
    responsive to the zoom level indicating that a scene viewpoint origin is at most a threshold distance from the tile:
        computing an initial three-dimensional bounding box for the tile;
        computing a two-dimensional projection of the tile onto the globe;
        determining whether the two-dimensional projection encompasses a center point of a viewing plane;
        responsive to the two-dimensional projection not encompassing the center point:
            identifying arc edges of the tile intersecting with the globe;
            identifying an arc edge of the identified arc edges that is closest to the center point;
            determining extremum coordinate values of the identified arc edge in each of $<x, y, z>$ coordinates;
            determining height, width, and depth of the arc edge based on the extremum coordinate values; and
            determining a resized three-dimensional bounding box for the initial three-dimensional bounding box using the height, width, and depth of the arc edge;
    determining, based on the resized three-dimensional bounding box, whether to cull the tile; and
    processing the tile for rendering dependent on the determination of whether to cull the tile.

2. A computer-implemented method of visually representing a geographical region mapped onto a surface of a globe in an electronic map system, the method comprising:
    obtaining information for a tile from a geographic database;
    computing an initial three-dimensional bounding box for the tile;
    identifying arc edges of the tile intersecting with the globe;
    identifying an arc edge of the identified arc edges that is closest to a center point of a viewing plane;
    determining a resized bounding box for the initial bounding box based on extremum coordinate values of the identified arc edge;
    determining, based on the resized bounding box, whether to cull the tile; and
    processing the tile for rendering dependent on the determination of whether to cull the tile.

3. The computer-implemented method of claim 2, further comprising:
    determining a zoom level of the tile;
    wherein the computing the initial three-dimensional bounding box is responsive to the zoom level indicating that a scene viewpoint origin is at most a threshold distance from the tile.

4. The computer-implemented method of claim 2, further comprising:
    determining extremum coordinate values of the identified arc edge in each of $<x, y, z>$ coordinates;
    determining height, width, and depth of the arc edge based on the extremum coordinate values; and
    determining the resized three-dimensional bounding box for the initial three-dimensional bounding box using the height, width, and depth of the arc.

5. The computer-implemented method of claim 4, further comprising using quaternion spherical linear interpolation to determine the extremum coordinate values.

6. The computer-implemented method of claim 2, wherein determining whether to cull the tile comprises determining whether the resized three-dimensional bounding box intersects a viewing frustrum determined using a current viewing position.

7. The computer-implemented method of claim 2, further comprising:
    creating a rectangular grid of vertices corresponding to corners of tiles to be rendered; and
    uploading the rectangular grid to a graphics processing unit (GPU).

8. The computer-implemented method of claim 7, further comprising determining how much of the rectangular grid to render based on proximity to a pole of the globe.

9. The computer-implemented method of claim 7, further comprising allocating a single memory buffer within the GPU to store the rectangular grid of vertices.

* * * * *